S. S. MORTON.
Fertilizer-Distributer.

No. 215,535. Patented May 20, 1879.

Witnesses:
Sidney P. Hollingsworth
Dewitt P. Cowl

Inventor:
Samuel S. Morton,
By his Attorneys,
Stansbury & Munn.

UNITED STATES PATENT OFFICE.

SAMUEL S. MORTON, OF YORK COUNTY, PENNSYLVANIA.

IMPROVEMENT IN FERTILIZER-DISTRIBUTERS.

Specification forming part of Letters Patent No. 215,535, dated May 20, 1879; application filed March 31, 1879.

*To all whom it may concern:*

Be it known that I, SAMUEL S. MORTON, of the county of York and State of Pennsylvania, have invented certain new and useful Improvements in Distributers for Fertilizers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
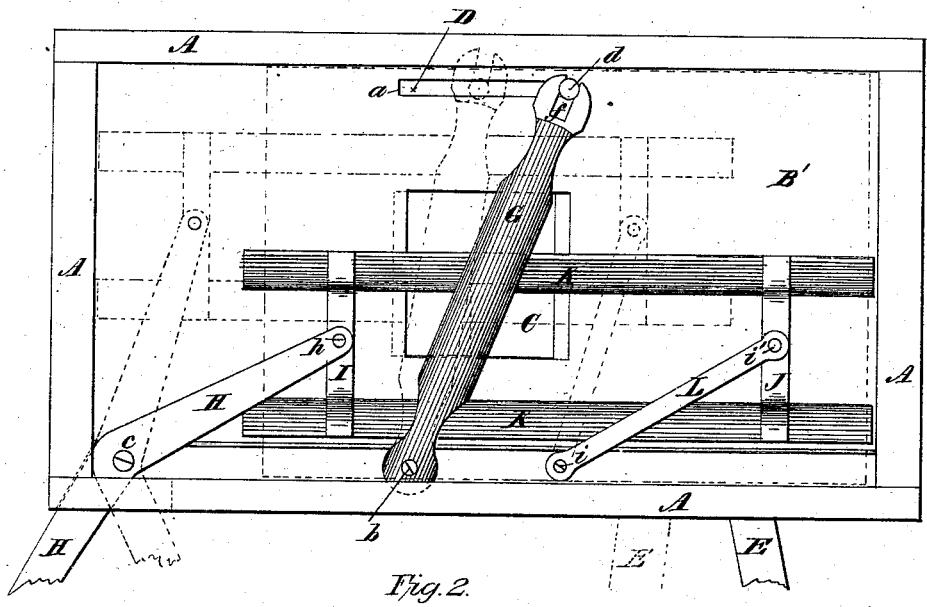
Figure 2:
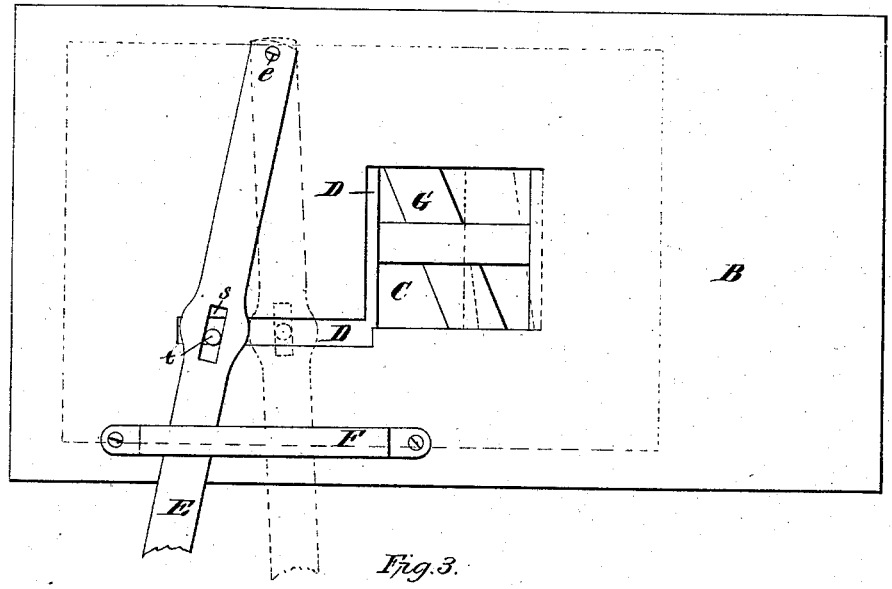
Figure 3:
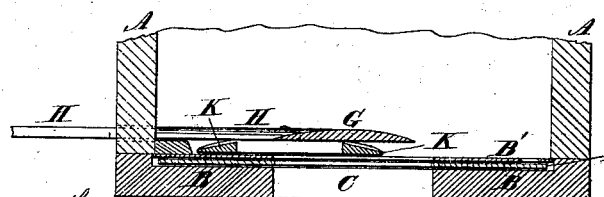

Figure 1 is a top view or plan of the box for holding the fertilizer and of the mechanism for delivering the same to the drill. Fig. 2 is a bottom view of the same. Fig. 3 is a transverse vertical section.

The same letter marks the same part wherever it occurs in the drawings.

My invention relates to that class of machines in which phosphates or other fertilizers are delivered in a finely divided or pulverized state along with the seed to the drill; and consists in the devices, hereinafter described, for regulating the quantity delivered, for reducing the material to proper condition for sowing, for preventing injury from stones or lumps, for stopping the escape of the fertilizer while the machine is not in motion, and for distributing the fertilizer with the least possible agitation of the mass in the hopper, undue agitation being liable with some fertilizers to reduce them to a pasty condition, unfit for sowing, and apt to clog the operation of the machine and render the distribution unequal.

As the present invention relates only to a mechanism directly connected with the hopper for receiving and delivering the fertilizer, it is unnecessary to show or describe the drill to which it is applied, which may be of any usual or convenient form and construction, the power for working the feed mechanism being derived in the ordinary way from the wheels of the drill when in motion.

To enable others to make and use my improvements, I will proceed to describe the construction and operation of the machine.

In the drawings, A marks the side, and B the bottom, of the hopper for receiving the fertilizer. It is provided with a double bottom, the upper one, B′, being of metal, and the lower one of wood, both being provided with a large opening, C, at or near the center, through which the contents of the hopper are delivered. Between the two bottoms is a metallic slide, D, also provided with an opening corresponding in position, size, and shape to that in the bottom of the hopper. The movement of the slide D controls the size of the opening C, and regulates the quantity of fertilizer to be sown. The slide is operated by means of a lever, E, having its fulcrum at $e$ on the bottom of the hopper. (See Fig. 2.) This lever is supported by guide-bar F and a slot, $s$, which receives stud $t$, projecting down from the slide-plate D. The back-and-forth movement of this lever gives a corresponding movement to the slide D, and regulates the size of the opening through the bottom of the hopper.

A stud, $d$, projects upward from the slide D through a slot, $a$, in the metallic bottom B′ of the hopper. This stud is received in a fork, $f$, in the free end of the vibrating bridge-bar G, which is pivoted at $b$ by its other end to the bottom of the hopper, as shown in Fig. 1. The shape of this bar is shown in cross-section in Fig. 3. By reason of its connection with slide D, it moves back and forth as that slide is moved, so as to extend in a diagonal direction over the opening C in every position of the slide, and afford support to the mass of material above it, and allow none to escape except what is forced out by the operation of the feed mechanism, now to be described.

A bent lever, H, having its fulcrum at $c$, is pivoted at $h$ to a transverse bar, I, which unites at one end two longitudinal bars, K, united at the other end by the bar J. The bars K K are chamfered off to a sharp edge on the outer sides, as shown in Fig. 3, their inner sides being square, as represented. A link, L, is pivoted at $i$ to the inner bottom plate of the hopper, and at $i'$ to the transverse bar J. The distance between pivots $i$ $i'$ is equal to that between fulcrum $c$ and pivot $h$. It results from this construction that, as the lever H is moved back and forth, the gathering and agitating frame I J K K is moved in a diagonal path across the bottom plate, B′, the bars I J and K K being always parallel to the sides of the hopper. As either bar K moves toward the side of the hopper its sharp edge passes easily under the material contained in the hopper. On its return movement the square edge of the bar sweeps the material toward the center of the hopper, and delivers it under the bridge-bar G to the opening C, through which it passes by suitable conduits to the proper point of distribution. The end bars I J act in a similar manner to draw the material from the ends of the hopper toward the central opening. The movements of the feed-frame under the bridge-bar tend to comminute the fertilizer and break up lumps and stones, while causing little or no agitation of the superincumbent mass, which is supported and kept from running out when the drill stops by the bridge-bar G.

What I claim, and desire to secure, is—

1. The combination of the lever E, slide D, and bridge-bar G, arranged and operating in the manner and for the purpose described.

2. The combination of the lever H, feed-frame I J K K, link L, and bridge-bar G, all constructed, arranged, and operating substantially as and for the purpose specified.

3. The bars K K, chamfered to a sharp edge on their outer sides and square on their inner edges, in combination with mechanism for giving them a diagonal shearing movement across the bottom of the hopper and over the delivery-opening, in the manner and for the purpose set forth.

In testimony that I claim the foregoing as my own invention I affix hereunto my signature in presence of two witnesses.

SAMUEL S. MORTON.

Witnesses:
W. H. SHEETZ,
ELLIS CHANDLEE.